United States Patent
Sano et al.

(10) Patent No.: US 8,142,750 B2
(45) Date of Patent: *Mar. 27, 2012

(54) METHOD OF MANUFACTURING ACTIVE MATERIAL

(75) Inventors: Atsushi Sano, Tokyo (JP); Keitaro Otsuki, Tokyo (JP); Yosuke Miyaki, Tokyo (JP); Takeshi Takahashi, Tokyo (JP); Akiji Higuchi, Kyoto (JP)

(73) Assignee: TDK Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/723,041

(22) Filed: Mar. 12, 2010

(65) Prior Publication Data

US 2010/0233058 A1 Sep. 16, 2010

(30) Foreign Application Priority Data

Mar. 16, 2009 (JP) .................. 2009-062969

(51) Int. Cl.
*C01B 25/30* (2006.01)
*H01M 4/04* (2006.01)
*H01M 4/1395* (2010.01)

(52) U.S. Cl. ........ 423/306; 429/221; 429/223; 429/224; 429/231.95

(58) Field of Classification Search ............. 423/306; 429/221, 223, 224, 231.1, 231.2, 231.3, 231.5, 429/231.9, 231.95

See application file for complete search history.

(56) References Cited

U.S. PATENT DOCUMENTS 6,632,415 B2 * 10/2003 Miller et al. .................. 423/700
2009/0068080 A1 * 3/2009 Faulkner ...................... 423/306

FOREIGN PATENT DOCUMENTS

| JP | A-2004-95386 | 3/2004 |
| JP | A-2008-66019 | 3/2008 |
| JP | A-2008-130526 | 6/2008 |

* cited by examiner

*Primary Examiner* — Emily Le
*Assistant Examiner* — Brittany Martinez
(74) *Attorney, Agent, or Firm* — Oliff & Berridge, PLC

(57) ABSTRACT

The present invention provides a method of manufacturing an active material which can form an electrochemical device excellent in discharge capacity. The method of manufacturing an active material in accordance with the present invention comprises a hydrothermal synthesis step of heating a mixture including a lithium compound, a metal compound containing one species selected from the group consisting of Fe, Mn, Co, Ni, and V, a phosphorus compound, and water within a reactor while keeping an internal pressure of the reactor at 0.3 MPa or lower by ventilating the inside of the reactor to the outside, and closing the reactor at a time when the temperature of the mixture reaches 100 to 150° C.; and a firing step of firing the mixture after the hydrothermal synthesis step.

4 Claims, 2 Drawing Sheets

METHOD OF MANUFACTURING ACTIVE MATERIAL

BACKGROUND OF THE INVENTION

1. Field of the Invention

The present invention relates to a method of manufacturing an active material.

2. Related Background Art

Metal oxides having an olivine-type structure expressed by LiMPO$_4$ (where M represents one species selected from the group consisting of Fe, Mn, Co, Ni, and VO) have been attracting attention as a positive electrode active material for lithium-ion secondary batteries because of their high safety. Among them, LiFePO$_4$ has actively been under study and development in particular (see Japanese Patent Application Laid-Open Nos. 2004-95386, 2008-66019, and 2008-130526).

SUMMARY OF THE INVENTION

LiFePO$_4$ has an electronic conductivity of about $10^{-8}$ Scm$^{-1}$ which is not always higher than that of other typical positive electrode active materials. The ionic conductivity of LiFePO$_4$ is not always higher than that of other typical positive electrode active materials, either. Therefore, lithium-ion secondary batteries using LiFePO$_4$ as a positive electrode active material may yield a discharge capacity which is not sufficient as compared with the theoretical capacity or a rate characteristic lower than that obtained by using other typical positive electrode active materials.

While examples of methods for improving the electronic conductivity of LiFePO$_4$ include making LiFePO$_4$ finer and forming a complex between LiFePO$_4$ and carbon, these methods cannot fully solve the problems mentioned above.

The electronic or ionic conductivity of LiFePO$_4$ may be controlled by methods of synthesizing LiFePO$_4$. For example, the inventors have found that LiFePO$_4$ formed by a hydrothermal synthesis method changes its crystal structure according to the pH of a starting material at the time of the hydrothermal synthesis and varies its electronic or ionic conductivity depending on the crystal structure. However, the crystal structure of LiFePO$_4$ formed by the hydrothermal synthesis method has been likely to become partly uneven. Therefore, it has not been easy for the crystal structure of LiFePO$_4$ to be controlled such as to improve the electronic or ionic conductivity thereof.

While examples of methods of manufacturing LiFePO$_4$ other than the hydrothermal synthesis method include various techniques such as solid-phase, wet, and sol-gel methods, none of these methods has fully solved the above-mentioned problems.

In view of the problems in the prior art mentioned above, it is an object of the present invention to provide a method of manufacturing an active material which can form an electrochemical device excellent in discharge capacity.

For achieving the above-mentioned object, the method of manufacturing an active material in accordance with the present invention comprises a hydrothermal synthesis step of heating a mixture including a lithium compound, a metal compound containing one species selected from the group consisting of Fe, Mn, Co, Ni, and V, a phosphorus compound, and water within a reactor while keeping an internal pressure of the reactor at 0.3 MPa or lower by ventilating the inside of the reactor to the outside, and closing the reactor at a time when the temperature of the mixture reaches 100 to 150° C.; and a firing step of firing the mixture after the hydrothermal synthesis step.

In the present invention, while the mixture is heated within the reactor, the internal pressure of the reactor is kept at 0.3 MPa or lower by ventilating the inside of the reactor to the outside in the hydrothermal synthesis step. At a point of time when the temperature of the mixture reaches 100 to 150° C., the reactor is closed, so that the internal pressure rapidly increases and exceeds 0.3 MPa, and the temperature of the mixture is also increased rapidly. As a result, this embodiment can attain an active material (LiMPO$_4$) excellent in ionic conductivity. An electrochemical device using the active material obtained by the present invention as a positive electrode active material attains a discharge capacity greater than that available when using active materials obtained by the conventional manufacturing methods.

The present invention can provide a method of manufacturing an electrochemical device excellent in discharge capacity.

DESCRIPTION OF THE PREFERRED EMBODIMENTS

Figure 1:
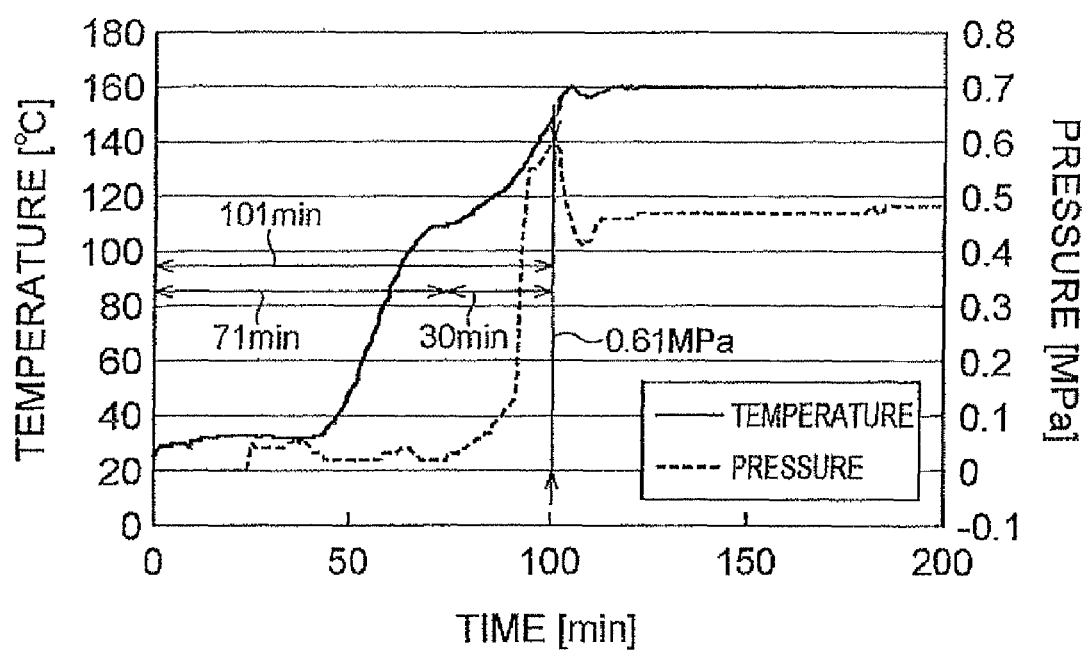
FIG. 1 is a graph illustrating changes in the temperature of a mixture within a reactor and the internal pressure of the reactor in the hydrothermal synthesis step in Example 1 of the present invention with time.

The method of manufacturing an active material in accordance with an embodiment of the present invention comprises a hydrothermal synthesis step of heating a mixture including a lithium compound, a metal compound containing one species selected from the group consisting of Fe, Mn, Co, Ni, and V, a phosphorus compound, and water within a reactor while keeping an internal pressure of the reactor at 0.3 MPa or lower by ventilating the inside of the reactor to the outside, and closing the reactor at a time when the temperature of the mixture reaches 100 to 150° C.; and a firing step of firing the mixture after the hydrothermal synthesis step.

This embodiment can finally synthesize an active material containing an olivine-type metal oxide expressed by the chemical formula of LiMPO$_4$ (where M represents one species selected from the group consisting of Fe, Mn, Co, Ni, and VO). Here, M in the chemical formula of LiMPO$_4$ can be constituted by a plurality of species of metal elements as long as the stoichiometric ratio of the chemical formula is satisfied thereby.

Materials for Active Material

Examples of the lithium compound include Li$_2$CO$_3$, LiOH.H$_2$O, and lithium acetate, which can be used either singly or in any combination.

Examples of the metal compound include FeC$_2$O$_4$, FeCl$_2$, FeSO$_4$, Fe(NO$_3$)$_2$, Fe(NO$_3$)$_3$, FeCl$_3$, MnCl$_2$, CoCl$_2$, NiCl$_2$, V$_2$O$_5$, and NH$_4$VO$_3$, which can be used either singly or in any combination.

Examples of the phosphorous compound include NH$_4$H$_2$PO$_4$ and (NH$_4$)$_2$HPO$_4$, which can be used either singly or in any combination.

Hydrothermal Synthesis Step

First, in the hydrothermal synthesis step, the above-mentioned lithium compound, metal compound, phosphorous compound, and water are put into a reactor such as an autoclave, so as to prepare a mixture (aqueous solution) having them dispersed therein. For preparing the mixture, a mixture of the metal compound, phosphorous compound, and water may be refluxed at first before adding the lithium compound thereto, for example. The reflux can form a complex of the metal compound and phosphorous compound.

The compounding ratios of the lithium compound, metal compound, and phosphorous compound, and vanadium sources in the mixture may be adjusted such that the resulting active material attains a composition expressed by the chemical formula of $LiMPO_4$.

The mixture may contain a carbon particle. This allows the carbon particle to support $LiMPO_4$ on its surface, thereby improving the electronic conductivity of the active material. Specific examples of the carbon particle include activated carbon, carbon black, soft carbon, and hard carbon.

Preferably, the carbon particle content in the mixture is adjusted such that the number of moles C of carbon atoms constituting the carbon particle and the number of moles M of metal elements contained in the metal compound satisfy the relationship of $0.05 \leq C/M \leq 1$. When the carbon particle content (number of moles C) is too small, the electronic conductivity and capacity density of the active material tend to decrease. When the carbon particle content is too large, the weight occupied by $LiMPO_4$ in the active material tends to decrease relatively, thereby reducing the capacity density of the active material. These tendencies can be suppressed when the carbon particle content falls within the range mentioned above.

Employable as the reactor is one equipped with means for heating the inside thereof, means for measuring the temperature therewithin (e.g., a thermocouple), means for closing the inside thereof, and leak means for letting out a gas generated within the reactor (e.g., a needle valve). This makes it possible to adjust the temperature of the mixture within the reactor and the internal pressure of the reactor to their desirable values in the hydrothermal synthesis step.

Changes in the temperature of the mixture and the internal pressure of the reactor in the hydrothermal synthesis step with time will now be explained with reference to FIG. 1.

In the hydrothermal synthesis step, the heating of the mixture within the reactor is started in a state where the inside of the reactor is ventilated to the outside through the leak means of the reactor. A part of the vapor generated within the reactor is continuously let out of the reactor through the leak means, so as to keep the internal pressure of the reactor to 0.3 MPa or lower. The temperature of the mixture is temporarily stabilized near 110° C., for example, and then the leak means is closed at a point of time when the temperature reaches 100 to 150° C. (e.g., when the temperature of the mixture reaches 110° C.), so as to block the ventilation between the inside and outside of the reactor, thereby closing the reactor. By closing the reactor, the internal pressure of the reactor is rapidly raised, so as to reach its maximum value (e.g., 0.7 MPa), while allowing the temperature of the mixture to reach its maximum value (e.g., 160° C.) immediately thereafter. Subsequently, the internal pressure of the reactor is rapidly lowered and stabilized at a steady-state value (e.g., 0.56 MPa) for the predetermined time, while the temperature of the mixture is stabilized at a steady-state value (e.g., 160° C.) for a predetermined time. After the predetermined time, the mixture is naturally cooled. This allows a seed crystal of the active material ($LiMPO_4$) or a precursor thereof to precipitate in the mixture, thereby growing crystals of the active material or precursor.

The inventors infer that a mechanism of changing the temperature and pressure with time as mentioned above can be explained as follows. However, the mechanism of changing the temperature and pressure with time as mentioned above has not completely been elucidated and is not limited to the following.

First, the hydrothermal synthesis step starts heating the mixture within the reactor and ventilates the inside of the reactor to the outside, thereby keeping the vapor pressure within the reactor (the pressure remaining after subtracting the atmospheric pressure from the internal pressure of the reactor) at a saturated vapor pressure or lower. Then, at a time when the temperature of the mixture reaches a high temperature of 100 to 150° C., the reactor is closed, so that the vapor pressure within the reactor rapidly increases to exceed the saturated vapor pressure, thereby reaching its maximum value. As the vapor pressure within the reactor increases rapidly, the temperature of the mixture is raised. Rapidly increasing the internal pressure of the reactor and the temperature of the mixture drastically enhances the water solubility of the lithium compound, metal compound, phosphorus compound or their reaction product (e.g., $LiMPO_4$), so as to raise the melting point of the mixture, whereby the vapor pressure within the reactor rapidly decreases immediately after reaching the maximum value, thus attaining an equilibrium state near the saturated vapor pressure, so as to be stabilized.

Closing the reactor at a time when the internal pressure of the reactor is 0.3 MPa or lower while the temperature of the mixture is lower than 100° C. makes it difficult for the internal pressure of the reactor to rise drastically after closing the reactor, whereby the advantageous effects of the present invention are harder to attain. It is also technically difficult for the mixture to attain a temperature higher than 150° C. in a state where the internal pressure of the reactor is 0.3 MPa or lower. Therefore, the present invention keeps the internal pressure of the reactor at 0.3 MPa or lower and closes the reactor at a time when the temperature of the mixture reaches 100 to 150° C.

Preferably, the pressure applied to the mixture in the hydrothermal synthesis step is 0.2 to 1 MPa. When the pressure applied to the mixture is too low, the resulting active material tends to lower its crystallinity and decrease the capacity density. When the pressure applied to the mixture is too high, the reactor tends to require a high pressure resistance, thereby increasing the cost for manufacturing the active material. These tendencies can be suppressed when the pressure applied to the mixture falls within the range mentioned above.

Preferably, the upper limit of the temperature of the mixture in the hydrothermal synthesis step is 150 to 200° C. When the temperature of the mixture is too low, the resulting active material tends to lower its crystallinity and decrease the capacity density. When the temperature of the mixture is too high, the reactor tends to require a high heat resistance, thereby increasing the cost for manufacturing the active material. These tendencies can be suppressed when the temperature of the mixture falls within the range mentioned above.

Firing Step

In the firing step, the mixture after the hydrothermal synthesis step is dried by evaporation and then fired. This yields an active material containing $LiMPO_4$.

Preferably, the firing temperature of the mixture in the firing step is 400 to 700° C. When the firing temperature is too low, the crystal growth of the active material tends to become insufficient, thereby lowering the capacity density of the active material. When the firing temperature is too high, the active material tends to grow its particles, so as to increase their sizes, thereby retarding the diffusion of lithium in the active material and lowering the capacity density of the active material. These tendencies can be suppressed when the firing temperature falls within the range mentioned above.

Preferably, the firing time for the mixture is 3 to 20 hr. Preferably, the firing atmosphere for the mixture is a nitrogen, argon, or air atmosphere.

The mixture obtained in the hydrothermal synthesis step may be heat-treated for about 1 to 30 hr at a temperature of about 60 to 150° C. before firing in the firing step. The heat treatment turns the mixture into a powder. Thus obtained powdery mixture may be fired. This can remove surplus moisture and organic solvent from the mixture, prevent the active material from taking up impurities into its crystals, and homogenize particle forms of the active material.

Examples of the finally obtained active material $LiMPO_4$ include phosphates containing lithium such as $LiFePO_4$, $LiMnPO_4$, $LiCoPO_4$, $LiNiPO_4$, and $LiVOPO_4$. These materials allow the occlusion and release of lithium ions, desorption and insertion (intercalation) of lithium ions, or doping and undoping of lithium ions with their counteranions (e.g., $PF_6^-$) to proceed reversibly.

$LiMPO_4$ can be used as an electrode material in electrochemical devices such as lithium-ion secondary batteries. Specifically, for example, $LiMPO_4$ is contained in at least one of active material layers in negative and positive electrodes (anode and cathode) in a lithium-ion secondary battery comprising the negative electrode, positive electrode, and an electrolyte layer having an ionic conductivity, in which the negative and positive electrodes oppose each other through the electrolyte layer. This can improve the discharge capacity and rate characteristic of the lithium-ion secondary battery. $LiMPO_4$ is suitable for the positive electrode active material in particular.

In the hydrothermal synthesis step in this embodiment, while the mixture is heated within the reactor, the internal pressure of the reactor is kept at 0.3 MPa or lower by ventilating the inside of the reactor to the outside, the reactor is closed at a time when the temperature of the mixture reaches 100 to 150° C., and the internal pressure of the reactor and the temperature of the mixture are rapidly raised. As a result, this embodiment makes it easier for crystals of $LiMPO_4$ to grow anisotropically in the mixture than in the conventional hydrothermal synthesis methods, whereby $LiMPO_4$ having a high orientation to the (020) plane can be obtained. Since Li diffusion paths within $LiMPO_4$ are formed along the b axis alone, lithium ions are more likely to be inserted into and desorbed from the (020) plane that is normal to the b axis than other crystal planes. Therefore, $LiMPO_4$ having a higher orientation to the (020) plane than $LiMPO_4$ obtained by the conventional hydrothermal synthesis methods improves the Li diffusing capacity. An electrochemical device using such $LiMPO_4$ as a positive electrode active material increases the discharge capacity and rate characteristic as compared with the case using an active material obtained by the conventional manufacturing methods.

Though a preferred embodiment of the method of manufacturing an active material in accordance with the present invention is explained in detail in the foregoing, the present invention is not limited to the above-mentioned embodiment. For example, the active material of the present invention can also be used as an electrode material for electrochemical devices other than the lithium-ion secondary battery. Examples of such electrochemical devices include secondary batteries other than the lithium-ion secondary battery, e.g., metallic lithium secondary batteries (using an electrode containing the active material of the present invention as a cathode and metallic lithium as an anode), and electrochemical capacitors such as lithium capacitors. These electrochemical devices can be used for power supplies for self-propelled micromachines, IC cards, and the like and decentralized power supplies placed on or within printed boards.

EXAMPLES

The present invention will now be explained more specifically with reference to an example and a comparative example, but will not be limited to the following example.

Example 1

Hydrothermal Synthesis Step

Into a 1.5-L autoclave vessel as a reactor, 500 g of distilled water, 34.7 g (0.3 mol) of $Li_3PO_4$, 59.6 g (0.3 mol) of $FeCl_2.4H_2O$, and 127 g (3.0 mmol) of LiCl were introduced, so as to prepare their mixture.

Figure 2:
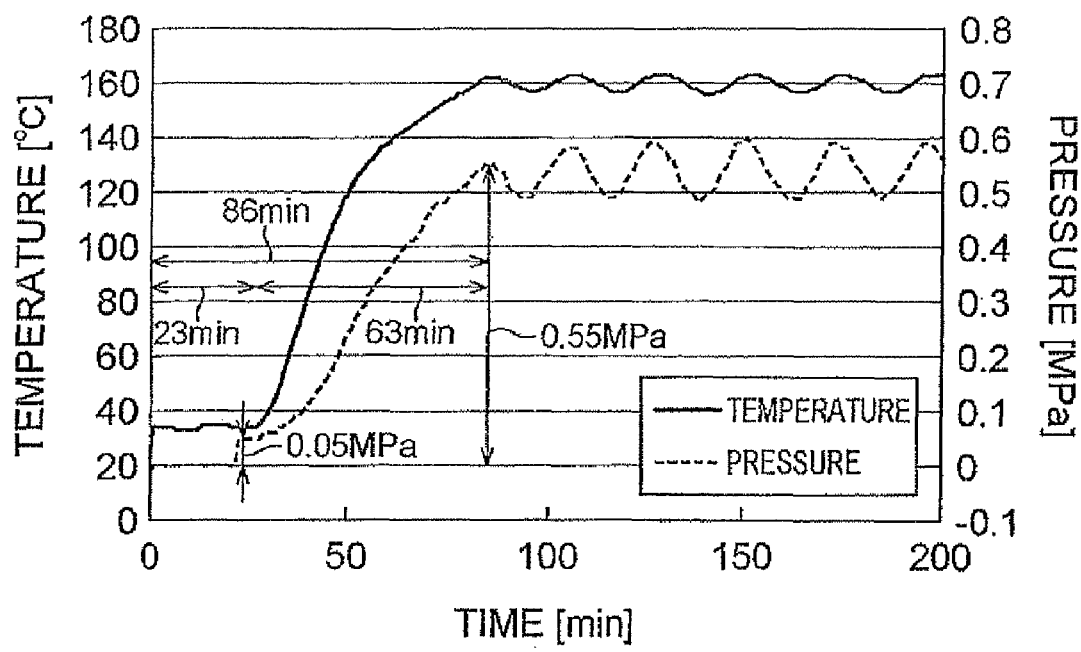
FIG. 2 is a graph illustrating changes in the temperature of a mixture within the reactor and the internal pressure of the reactor in the hydrothermal synthesis step in Comparative Example 1.

Next, the temperature of the mixture and the internal pressure of the autoclave vessel were changed as illustrated in FIG. 1, so as to carry out a hydrothermal synthesis step. In FIG. 1 and FIG. 2 which will be explained later, the abscissa indicates the time (unit: min) elapsed after starting heating the mixture, the left ordinate indicates the temperature (unit: ° C.) of the mixture, and the right ordinate indicates the pressure (unit: MPa) remaining after subtracting the atmospheric pressure (0.1 MPa) from the internal pressure of the autoclave vessel. The temperature of the mixture was measured by a thermocouple placed within the autoclave vessel, while the internal pressure of the autoclave vessel was measured by a pressure gauge placed within the autoclave vessel.

First, in the hydrothermal synthesis step, the heating of the mixture within the autoclave vessel was started in a state where a needle valve (leak means) of the autoclave vessel was open, and the inside of the autoclave vessel was continuously ventilated to the outside through the needle valve, so as to keep letting out a part of the vapor generated within the autoclave vessel, whereby the internal pressure of the autoclave vessel was held at 0.3 MPa or lower. When 71 min passed after starting heating the mixture, the temperature of the mixture reached 110° C. At the time when the temperature of the mixture reached 110° C., the needle valve was closed, so as to block the ventilation between the inside and outside of the autoclave vessel, thereby closing the autoclave vessel. Closing the autoclave vessel drastically raised the internal pressure of the autoclave vessel. When 30 min passed after closing the autoclave vessel, the internal pressure of the autoclave vessel reached its maximum value of 0.71 MPa. After reaching 0.71 MPa, the internal pressure of the autoclave vessel drastically decreased to 0.5 MPa and then stabilized at 0.56 MPa. The temperature of the mixture within the reactor was continuously raised after starting heating, so as to reach 160° C. immediately after the internal pressure of the autoclave vessel reached the maximum value, and left stabilized there. When 2800 min passed after the temperature of the mixture had reached 160° C., the heating of the mixture was stopped.

In the above-mentioned hydrothermal synthesis step, the mixture was continuously refluxed at 300 rpm.

The mixture was held within the vessel for about 4 hr after stopping heating the mixture, whereby the temperature within the vessel was naturally lowered to 36.4° C. About 300 ml of water were added to thus cooled mixture. Thereafter, the mixture was transferred onto a tray, dried for about 23 hr at 90° C. by evaporation with an oven, and then pulverized, so as to yield a powder.

Firing Step

Thus obtained powder was put into an alumina crucible, fired for 4 hr at 450° C., and then rapidly cooled. The powder was fired in an air atmosphere. In the firing step, the firing temperature was raised from room temperature to 450° C. in 45 min. This firing step yielded an active material of Example 1.

Making of an Evaluation Cell

The active material of Example 1 and a mixture of polyvinylidene fluoride (PVDF) as a binder and acetylene black were dispersed into N-methyl-2-pyrrolidone (NMP) acting as a solvent, so as to prepare a slurry. The slurry was prepared such that the weight ratio among the active material, acetylene black, and PVDF became 84:8:8 therein. The slurry was applied onto an aluminum foil acting as a current collector, dried, and then extended under pressure, so as to yield an electrode (positive electrode) formed with an active material layer containing the active material of Example 1.

Thus obtained electrode and an Li foil acting as its opposite electrode were subsequently laminated with a separator made of a microporous polyethylene film interposed therebetween, so as to yield a multilayer body (matrix). This multilayer body was put into an aluminum-laminated pack, a 1-M $LiPF_6$ solution was injected therein as an electrolytic solution, and then the pack was sealed in vacuum, so as to make an evaluation cell of Example 1.

Comparative Example 1

In Comparative Example 1, the temperature of the mixture and the internal pressure of the autoclave vessel were changed as illustrated in FIG. 2 in a state where the needle valve of the autoclave vessel was kept closed, so as to heat the mixture for 2800 min in total in the hydrothermal synthesis step. That is, the hydrothermal synthesis step was carried out in the state where the needle valve of the autoclave vessel was kept closed in Comparative Example 1. An active material of Comparative Example 1 was obtained by the same method as that of Example 1 except for the hydrothermal synthesis step.

Next, an evaluation cell of Comparative Example 1 was made by the same method as that of Example 1 except that the active material of Comparative Example 1 was contained in the active material containing layer.

Measurement of the Crystal Structure

The result of powder X-ray diffraction (XRD) proved that both of active materials of Example 1 and Comparative Example 1 contained $LiFePO_4$. The ratio $I(020)/I(111)$ of the diffraction intensity $I(020)$ at the (020) plane to the diffraction intensity $I(111)$ at the (111) plane in Example 1 was 1.02, which was found greater than that in Comparative Example 1, i.e., 0.86.

Measurement of the Discharge Capacity

Using each of the evaluation cells of Example 1 and Comparative Example 1, the discharge capacity (unit: mAh/g) at a discharge rate of 0.1 C (the current value by which constant-current discharging at 25° C. completed in 10 hr) was measured. The discharge capacity of Example 1 was 151 mAh/g, whereas that of Comparative Example 1 was 111 mAh/g. That is, Example 1 was seen to yield a discharge capacity higher than that of Comparative Example 1.

What is claimed is:

1. A method of manufacturing an active material, the method comprising:
   a hydrothermal synthesis step of heating a mixture including a lithium compound, a metal compound containing one species selected from the group consisting of Fe, Mn, Co, Ni, and V, a phosphorus compound, and water within a reactor while keeping an internal pressure of the reactor at 0.3 MPa or lower by ventilating the inside of the reactor to the outside of the reactor, and closing the reactor at a time when the temperature of the mixture reaches a temperature in the range of from 100 to 150° C. and continuing heating;
   a firing step of firing the mixture at a temperature in the range of from 400 to 700° C. after the hydrothermal synthesis step, wherein
   the active material comprises at least one phosphate selected from the group consisting of $LiFePO_4$, $LiMnPO_4$, $LiCoPO_4$, $LiNiPO_4$, and $LiVOPO_4$.

2. The method of manufacturing an active material according to claim 1, wherein the upper limit of the temperature of the mixture in the hydrothermal synthesis step is 150 to 200° C.

3. The method of manufacturing an active material according to claim 1, wherein the firing time for the mixture is 3 to 20 hours.

4. The method of manufacturing an active material according to claim 1, wherein the heating is continued until the temperature of the mixture reaches 150 to 200° C.; a cooling step of cooling the mixture obtained from the hydrothermal synthesis step follows the hydrothermal synthesis step; the mixture obtained after the cooling step is heat-treated for about 1 to 30 hours at a temperature of about 50 to 150° C. before the firing step.

* * * * *